US005983440A

United States Patent [19]
Remington

[11] Patent Number: 5,983,440
[45] Date of Patent: Nov. 16, 1999

[54] LOW PROFILE WINDSHIELD WIPER ASSEMBLY

[75] Inventor: Philip M. Remington, Dearborn, Mich.

[73] Assignee: Ford Motor Company, Dearborn, Mich.

[21] Appl. No.: 08/511,213

[22] Filed: Aug. 4, 1995

[51] Int. Cl.⁶ .................................. B60S 1/38; B60S 1/04
[52] U.S. Cl. ...................................... 15/250.44; 15/250.46
[58] Field of Search ......................... 15/250.003, 250.46, 15/250.44, 250.451, 250.452, 250.453, 250.454, 250.48, 250.41, 250.47, 245, 250.201

[56] References Cited

U.S. PATENT DOCUMENTS

| | | | |
|---|---|---|---|
| 1,684,477 | 9/1928 | Demand ............................... | 15/250.48 |
| 1,872,095 | 8/1932 | Romano et al. ...................... | 15/250.32 |
| 2,634,446 | 4/1953 | Mackie et al. ....................... | 15/250.453 |
| 2,739,336 | 3/1956 | O'Shei ................................. | 15/250.451 |
| 2,782,449 | 2/1957 | Anderson ............................. | 15/250.32 |
| 3,060,480 | 10/1962 | Ziegler ................................. | 15/250.452 |
| 3,390,417 | 7/1968 | Kohler et al. ......................... | 15/250.44 |
| 3,405,421 | 10/1968 | Tomlin ................................. | 15/250.44 |
| 3,427,637 | 2/1969 | Quinlan et al. ...................... | 15/250.451 |
| 4,286,351 | 9/1981 | Mower et al. ........................ | 15/250.42 |
| 4,300,259 | 11/1981 | Maiocco ............................... | 15/250.32 |
| 4,543,682 | 10/1985 | Kessler et al. ........................ | 15/250.42 |
| 5,048,145 | 9/1991 | Takahaashi et al. .................. | 15/250.42 |
| 5,339,510 | 8/1994 | Roth et al. ............................ | 15/250.46 |

FOREIGN PATENT DOCUMENTS

| | | |
|---|---|---|
| 1048036 | 12/1953 | France . |
| 1076221 | 10/1954 | France ................................ 15/250.46 |
| 1366498 | 6/1964 | France ................................ 15/250.46 |
| 689339 | 2/1940 | Germany ............................ 15/250.46 |
| 1197339 | 7/1965 | Germany . |
| 178957 | 11/1982 | Japan .................................. 15/250.44 |
| 63-145155 | 12/1986 | Japan . |
| 802388 | 10/1958 | United Kingdom . |
| 901282 | 7/1962 | United Kingdom . |
| 1097593 | 1/1968 | United Kingdom . |
| 1320059 | 6/1973 | United Kingdom . |

OTHER PUBLICATIONS

Vol. 006 No. 167, May 1982, Patent Abstracts of Japan.

*Primary Examiner*—Gary K. Graham
*Attorney, Agent, or Firm*—DAvid B. Kelley

[57] ABSTRACT

An automotive windshield wiper assembly has a wiper arm, a wiper blade, and a superstructure connecting the wiper arm and the wiper blade for maintaining a constant load distribution thereacross. The superstructure has a pair of yokes connected to the blade and a non-channeled harness attached to the wiper arm and pivotally joined on opposite ends thereof to yoke members, the harness having two sides which allow relatively unrestricted pivotal motion of the yoke members therebetween. The superstructure thus operates in a scissors-like fahsion to prevent ice, snow, or debris from building up therein. The yoke members are side-saddled over the wiper blade, and the harness is side-saddled over the yoke members so that the height of the yoke members above the blade is substantially the same as the height of the harness above the blade to provide a low profile wiper assembly.

9 Claims, 4 Drawing Sheets

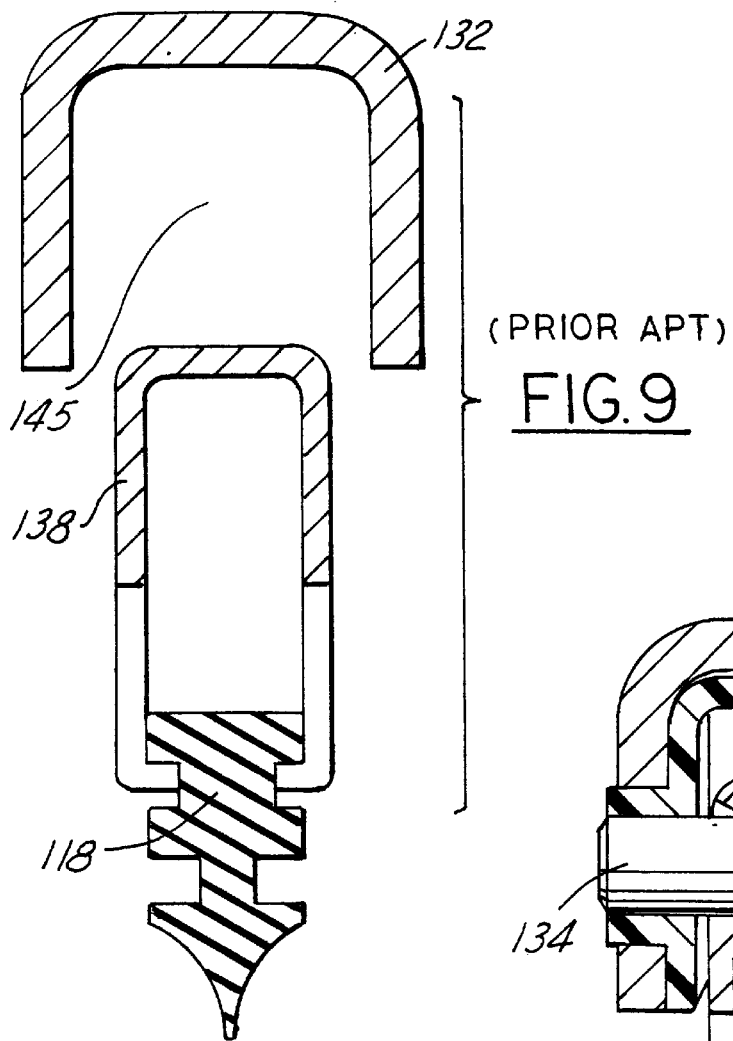
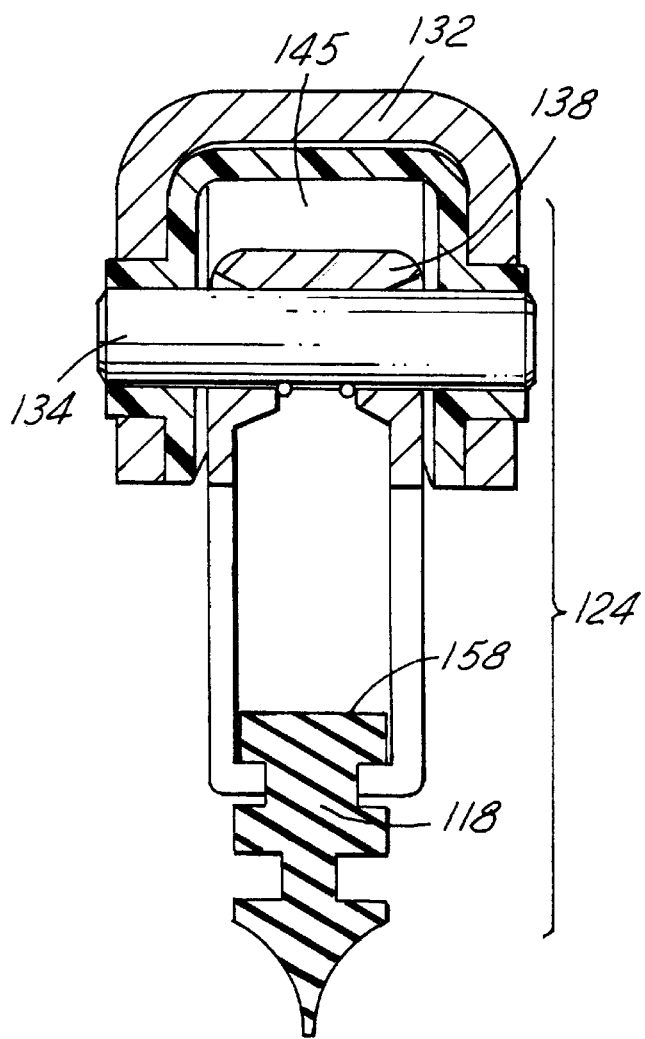
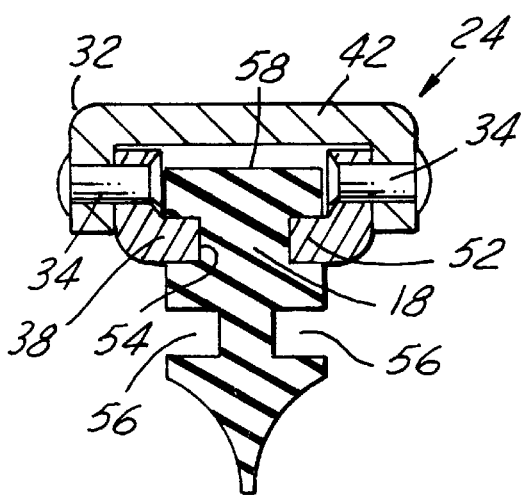
FIG. 7
(PRIOR ART)
FIG. 8
(PRIOR ART)
FIG. 9

LOW PROFILE WINDSHIELD WIPER ASSEMBLY

FIELD OF THE INVENTION

The present invention relates to automotive windshield wipers and, more particularly, to a low-profile, non-channeled windshield wiper assembly.

BACKGROUND OF THE INVENTION

Automotive windshield wiper assembly designers have long recognized the need for a windshield wiper assembly which provides a nearly uniform load distribution across the wiper blade so that the blade conforms evenly to the windshield. In order to attain this uniform load distribution, the wiper arm is typically connected to a blade superstructure in which the wiper arm is attached to a central yoke, which is likewise attached to a pair of secondary yokes on either end, the secondary yokes then being attached along the length of the wiper blade. The yokes are typically pivotably attached to each other and to the wiper arm so that the wiper blade may flex when moving over an obstruction. In order to achieve that result, while also preventing obstruction of the yokes by accumulation of ice, snow, or other debris, owing in part to the design of the yokes, there must be a substantial distance between the central yoke and the secondary yokes to provide the required space for motion therebetween. Examples of such windshield wiper assemblies having high profile superstructures include U.S. Pat. No. 5,339,510 (Roth et al.), U.S. Pat. No. 5,048,145 (Takahashi et al.), U.S. Pat. No. 4,543,682 (Kessler et al.), U.S. Pat. No. 2,782,449 (Anderson), and French Patent 1,048,036 (Oishei). As shown in FIG. 5 herein, the superstructure of prior wiper blade constructions adds considerably to the height of the wiper assembly above a windshield.

Such high profile wiper blade constructions are undesirable on some windshield designs, particularly the "cab forward" windshield. The "cab forward" windshield design places the windshield at a lower angle from the horizontal, thus presenting a more aerodynamic profile and a more pleasing appearance. That design, however, potentially pushes the windshield wiper assembly more into the line of vision of a driver (FIG. 1).

Some windshield wiper assemblies have attached the wiper arm along side the wiper blade, as in U.S. Pat. No. 4,300,259 (Maiocco) and U.S. Pat. No. 1,684,477 (Demand). Such wipers do not, however, provide the uniform load distribution required to obtain satisfactory windshield wiping.

An additional problem with prior windshield wiper superstructures is the use of channeled yokes, which have a tendency to trap ice, now, and other debris between the three sides of the yoke comprising the channel, as seen in FIGS. 5, 8, and 9.

There is thus a need for a low profile windshield wiper assembly which provides a uniform load distribution across the wiper blade while not restricting motion of the yokes due to accumulated debris therebetween.

SUMMARY OF THE INVENTION

The present invention addresses the deficiencies in the related art by providing an automotive windshield wiper assembly having a wiper blade and a superstructure connected thereto for maintaining a constant load distribution thereacross. The superstructure can have multiple layers of yokes added thereto with no added height increase above the wiper blade. Multiple layers of yokes are used complimentary to provide the required rigidity of the superstructure in the direction of motion of the blade across the windshield. The superstructure comprises a harness yoke attached to a wiper arm, and at least two yokes connected to the blade and joined to the harness so that the height of either of the yokes above the blade is substantially the same as the height of the harness above the blade, so that the superstructure has a low profile with respect to the windshield. The harness is a non-channeled, two-sided yoke having a generally parallel pair of sides with a slot therebetween for receiving the yokes attached to the wiper blade. The yokes are likewise constructed of a generally parallel pair of yokes sides which are sidesaddled onto an upper portion of the wiper blade on opposite ends thereof. The harness is pivotally joined on opposite ends to a middle section of each yoke along axes of rotation intersecting the wiper blade in such a manner as to be sidesaddled over the pair of yokes. The yokes have a pair of tabs for sidably connecting with longitudinally extending blade grooves along opposite sides of the blade.

An advantage of the present invention is a low profile windshield wiper assembly providing a uniform load distribution across the wiper blade.

Another advantage of the present invention is a windshield wiper assembly having multiple two-sided yokes laterally attached to the wiper blade so as to eliminate motion restriction between the yokes due to accumulation of ice and snow.

Still another advantage is a superstructure comprised of yokes having a geometry that does not increase the height of the wiper assembly with added layers of yokes.

Yet still another advantage is a windshield wiper assembly which is inexpensive to manufacture and easy to assembly.

Another advantage of the present invention is a windshield wiper assembly having yokes with rectangular cross-sections, one fitted within the other, so that motion therebetween shears away ice, snow, or other debris accumulated on the wiper assembly.

A feature of the present invention is a dual layer windshield wiper assembly superstructure mounted laterally to the side of the wiper blade so as not to increase the height of the assembly.

Another feature of the present invention is a yoke construction consisting of two parallel sides connected by at least one bridge member best defining a slot therebetween.

Still another feature is a wiper assembly having a two-sided, non-channeled harness for allowing yokes joined thereto to pivot therein in a relatively unrestricted fashion.

BRIEF DESCRIPTION OF THE DRAWINGS

These and other objects, advantages and features of the present invention will be apparent to those skilled in the windshield wiping arts upon reading the following description with reference to the accompanying drawings, in which:

FIG. 7 is a cross-sectional view of a wiper blade assembly taken along line 7—7 of FIG. 6;

FIG. 8 is a cross-sectional view of a prior art wiper blade assembly taken along line 8—8 of FIG. 5; and FIG. 9 is a cross-sectional view of a prior art wiper blade assembly taken along line 9—9 of FIG. 5.

DETAILED DESCRIPTION OF THE PREFERRED EMBODIMENTS

Figure 1:
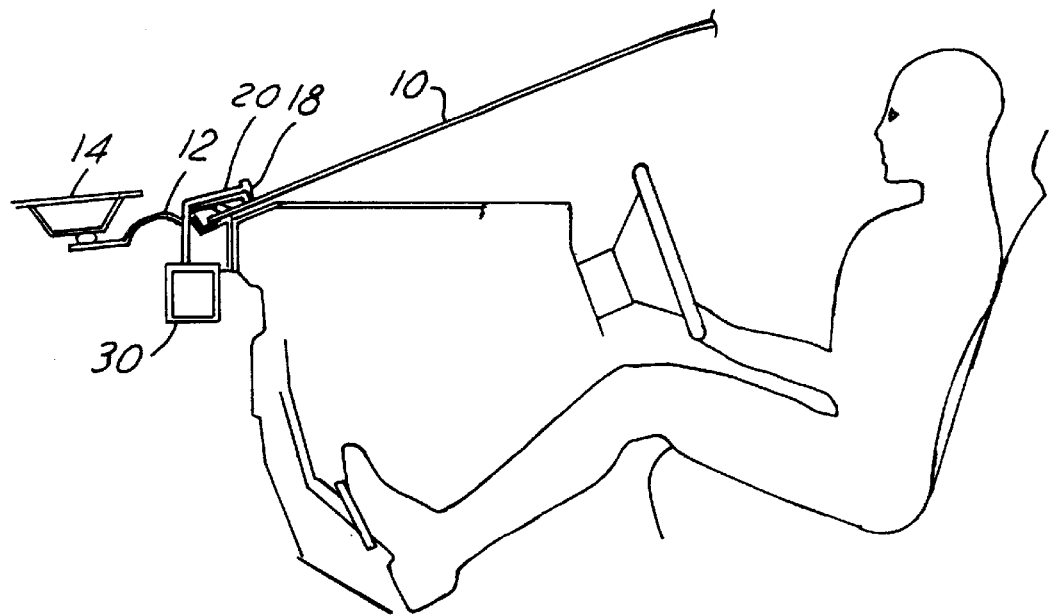
FIG. 1 is a side sectional view of an automotive vehicle passenger compartment showing a cab forward windshield design.
Figure 2:
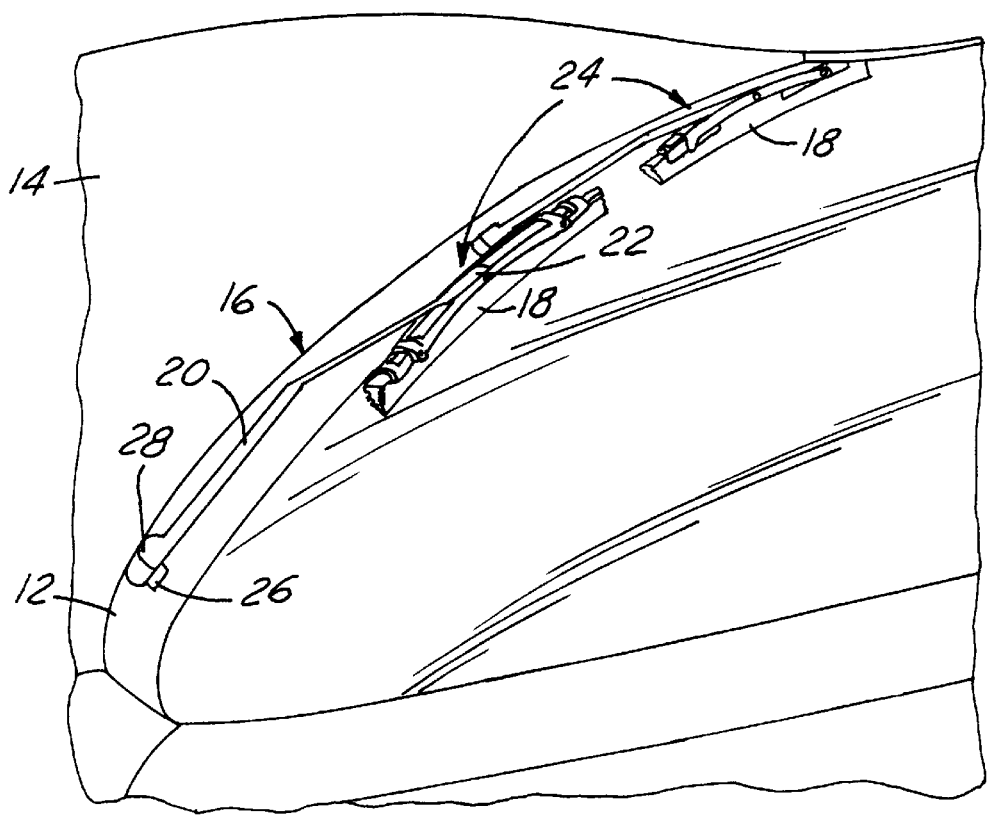
FIG. 2 is an outside lateral perspective view of a windshield showing a pair of windshield wiper assemblies according to the present invention.

Referring now to the drawings, and in particular to FIGS. 1 and 2 thereof, an automotive windshield 10 is shown having a laterally extending cowl 12 along a lower section thereof between a deck lid 14. A pair of windshield wiper assemblies 16 are situated on the cowl 12 and have wiper blades 18 resting on the windshield 10. The wiper blade assemblies have wiper arms 20 connected on one end 22 to the wiper blade assembly 24 and is mounted for oscillatory motion on a wiper boss 26 at the other end 28. The boss 26 is oscillated through conventional wiper system means 30 (shown as a box for convenience), which typically includes a motor and various linkages associated therewith (not shown) attached to the wiper boss 26 as is known in the automotive windshield wiping art.

Figure 3:
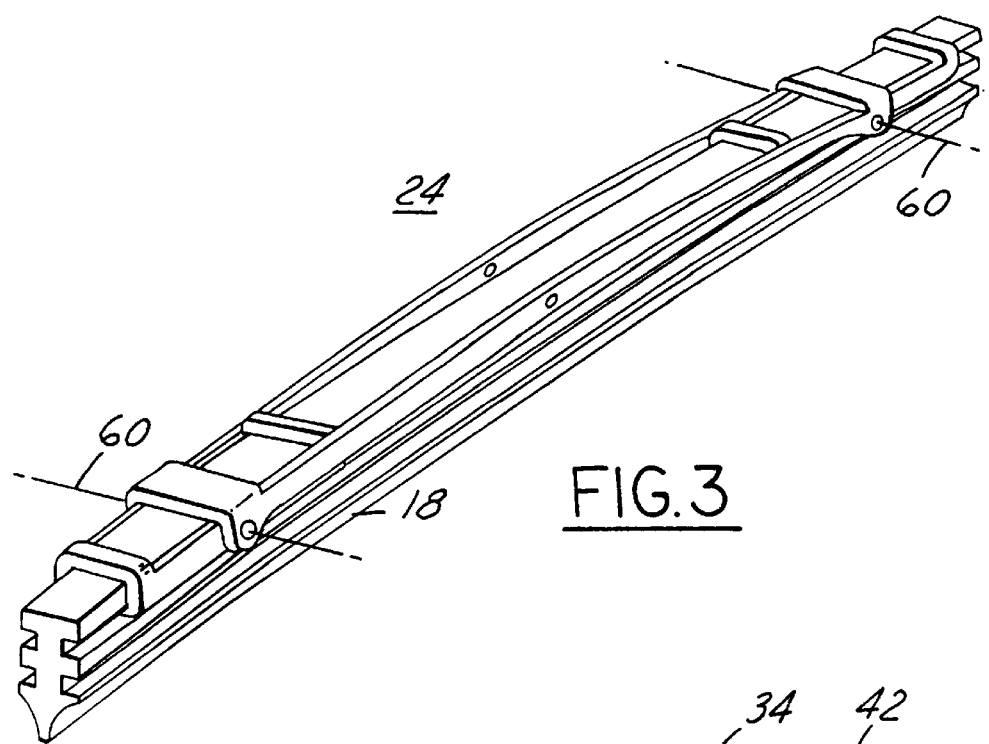
FIG. 3 is a perspective view of a wiper blade assembly according to the present invention.
Figure 4:
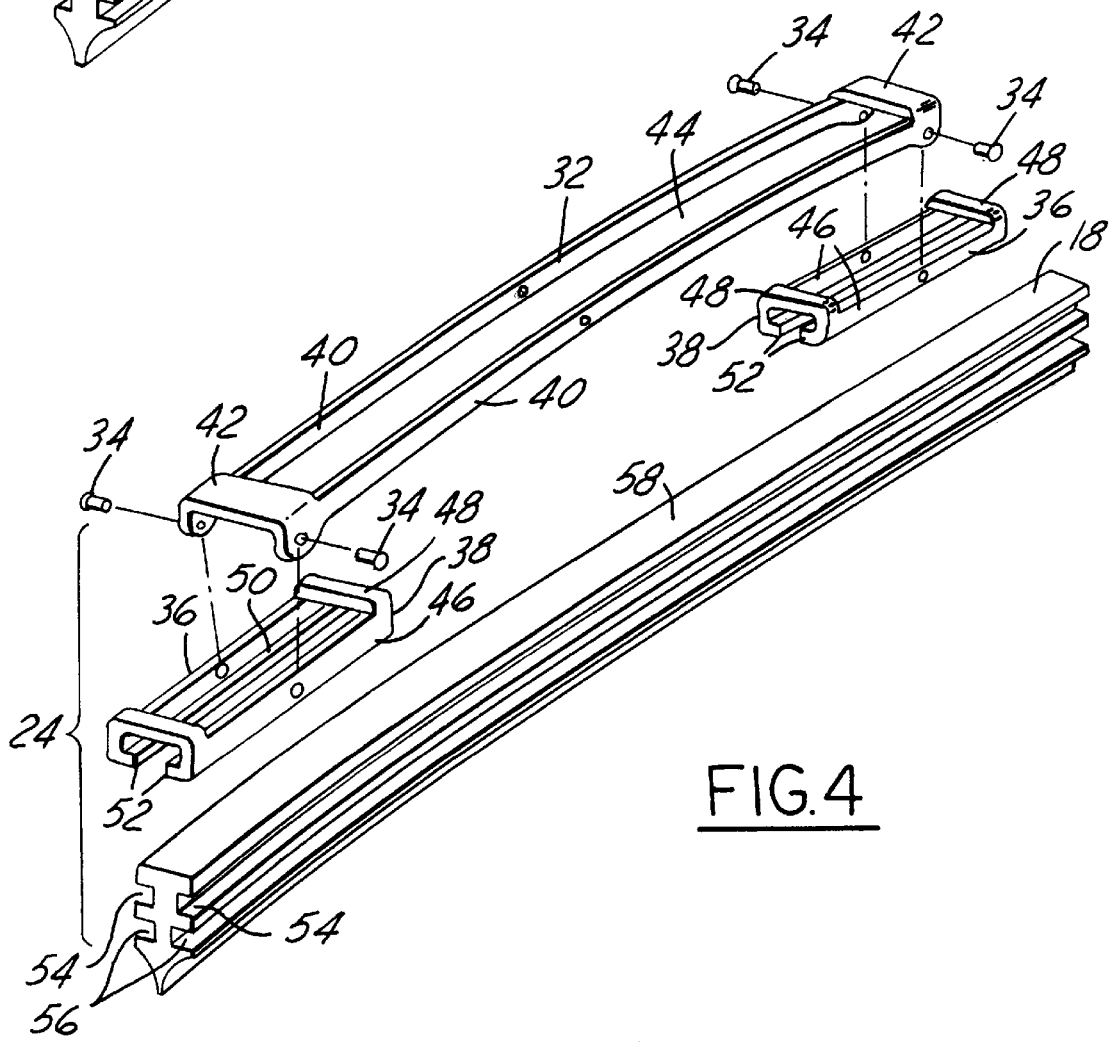
FIG. 4 is an exploded perspective view of the wiper blade assembly of FIG. 3.

Turning now to FIGS. 3 and 4, a wiper blade assembly 24 is shown in assembled perspective view (FIG. 3) and in an exploded perspective view (FIG. 4). The wiper blade assembly 24 preferably has a harness 32 connected on opposite ends thereof with rivets 34 to a middle section 36 of each of a pair of yokes members 38. The harness 32 has a pair of generally parallel side members 40 connected on ends thereof by bridge member 42. The harness 32 is thus a non-channeled, two-sided yoke having a slot 44 between the sides 40, which allows the yoked members 38 to move therebetween in a scissor-like fashion. Such motion shears accumulations of ice or snow, which may inhibit movement of the yoke members 38 with respect to the harness 32.

Figure 5:
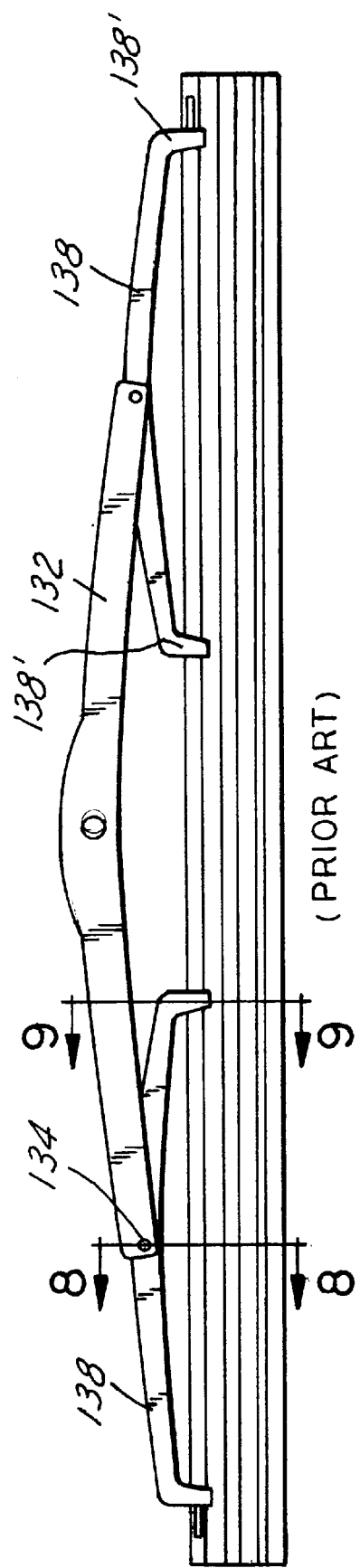
FIG. 5 is a side view of a prior art wiper blade assembly.
Figure 6:
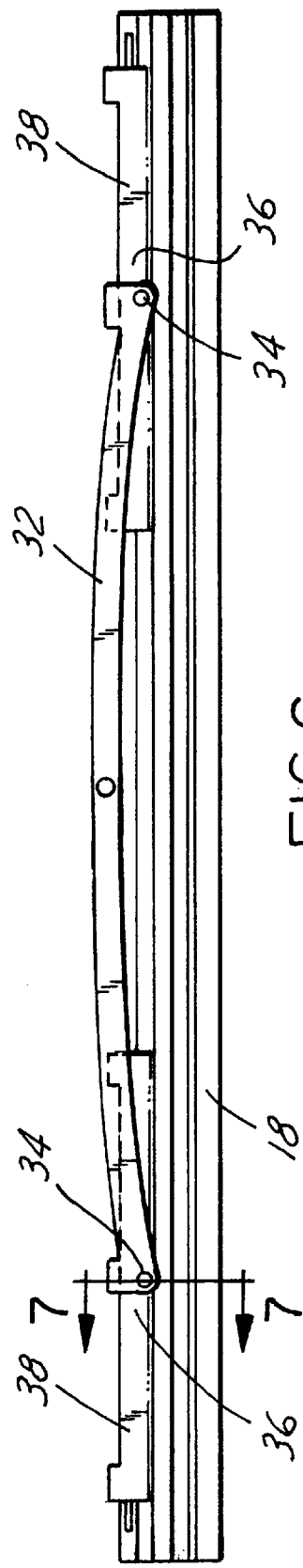
FIG. 6 is a side view of a wiper blade assembly according to the present invention.

As seen in FIG. 4, yoke members 38 each have a pair of generally parallel yoke sides 46 connected on ends thereof by yoke connectors 48 which span a yoke slot 50, defined between the yokes sides 46. Along a lower edge of the sides 46 are a pair of inwardly turned tabs 52, preferably extending the length of the yoke members 38. The tabs fit within longitudinally extending grooves 54 on opposite sides of wiper blade 18. For a stiffer wiper blade 18 operation, a lower set of grooves 56 can be used, provided that yoke members 38 are accordingly adjusted so as to allow tabs 52 to slide into the grooves 56. An advantage of having tabs 52 extend along the length of yoke members 38 is that a more even load distribution will be achieved along wiper blade 18 (FIG. 6). Prior art superstructures, such as that shown in FIG. 5, have yokes 138 attached at only two points 138' along the length of blade 118.

Returning to FIGS. 3 and 4, after yokes 38 have been placed onto opposite ends of wiper blade 18 by sliding tabs 52 into grooves 54, so that the sides 46 are side-saddled over an upper portion 58 of wiper blade 18, the harness 32 is then side-saddled over the yoke members 38. For purposes of this specification, side-saddled means having side members substantially laterally adjacent the wiper blade, as shown in FIG. 3. An inner yoke connector 48 on each of the yoke members 38 fits within the harness slot 44. The harness 32 is attached with rivets 34, which pass through side members 36 of the yoke members 38 along an axis 60 perpendicularly intersecting the blade 18. The superstructure that is the harness 32 and the yoke members 38 thus side mounted provide the desirable uniform load distribution along the blade 18, while also presenting a low profile on the windshield 10. This latter advantage is achieved because the height of either of the two yoke members 38 above the blade 18 is substantially the same as the height of the harness 32 above the blade 18.

The construction of the wiper blade assembly 24 herein described allows relatively unrestricted pivotal motion of the yoke members 38 through the harness 32.

As seen in FIG. 7, the wiper blade assembly 24 of the present invention has a low profile, as compared to the profile of a prior wiper blade assembly 124, as seen in FIG. 8. The prior wiper blade assembly 124 has a channel-shaped harness 132 mounted over a channel-shaped yoke 138. The yoke 138 is mounted so as to be well above the blade top 158 of the wiper blade 118. Between the harness 132 and the yoke 138 is a space 145 in which ice, snow, or other debris may accumulate, which potentially inhibits movement of the yoke 138 with respect to the harness 132, particularly rotational movement about the rivet 134. Since the harness is channel-shaped, which for purposes of this disclosure means having at least three sides, movement of the yoke 138 toward the harness 132 compresses debris in space 145, and when the debris is sufficiently compacted, prevents movement of the yoke 138. Such restrictive movement adversely affects the wiper operation, potentially resulting in premature wiper blade 118 deterioration. The area for debris, ice, and snow to accumulate between the channel-shaped harness 132 and the yoke 138 can be quite large relative to the size of the wiper blade, as is depicted in FIG. 9. The present invention eliminates that potentiality by having non-channeled yoke members 38 and harness 32.

Although the preferred embodiment of the present invention has been disclosed, various changes and modifications may be made without departing from the scope of the invention as set forth in the appended claims.

I claim:

1. An automotive windshield wiper assembly comprising:
a wiper arm;
means for oscillating said wiper arm;
a wiper blade; and
superstructure means connecting said wiper arm and said wiper blade for maintaining a constant load distribution thereacross, the superstructure means having:
at least two elongate yokes connected to said blade, each of said at least two yokes having a generally parallel pair of yoke sides connected by at least one yoke connector spanning a yoke slot between said pair of yoke sides, each of said at least two yokes also having a pair of tabs extending the length of the yokes for slidably connecting with a pair of longitudinally extending blade grooves along opposite sides of the blade; and
a harness, comprised of two generally parallel sides, attached to said wiper arm and having a first of said at least two yokes pivotally joined on a first harness end and a second of said at least two yokes pivotally joined on a second harness end so as to allow the at least two yokes to move through the harness between the two generally parallel sides.

2. A windshield wiper assembly according to claim 1 wherein said two generally parallel sides are connected by at least one bridge member spanning a harness slot therebetween.

3. A windshield wiper assembly according to claim 1 wherein said wiper arm is attached at a center section of said harness.

4. A windshield wiper assembly according to claim 1 wherein said first and said second of said at least two yokes are pivotally joined at first and second middle sections thereof, respectively, on said first harness end and said second harness end, respectively.

5. A windshield wiper assembly according to claim 1 wherein an upper-surface of the wiper blade defines a blade plane, and wherein the at least two yokes are coplanar with the blade plane and the harness is substantially coplanar with the blade plane, said superstructure means thus having a low profile with respect to said wiper blade.

6. An automotive windshield wiper assembly comprising:
   a wiper arm;
   means for oscillating said wiper arm;
   a wiper blade; and
   a superstructure connecting the wiper arm and the wiper blade for maintaining a constant load distribution thereacross, the superstructure having:
   a harness attached to the wiper arm and having a generally parallel pair of harness sides connected by at least one bridge member spanning a harness slot therebetween; and
   at least two elongate yokes connected to the blade and joined to the harness so as to allow the at least two yokes to move through the harness slot, each of the at least two yokes having a generally parallel pair of yoke sides connected by at least one yoke connector scanning a yoke slot between the pair of yoke sides, each of the at least two yokes also having a pair of tabs extending the length of the yokes for slidably connecting with a pair of longitudinally extending blade grooves along opposite sides of the blade.

7. A windshield wiper assembly according to claim 6 wherein the wiper arm is attached at a center section of the harness.

8. A windshield wiper assembly according to claim 6 wherein the first and the second of the at least two yokes are pivotally joined at first and second middle sections thereof, respectively, on the first harness end and the second harness end, respectively.

9. A windshield wiper assembly according to claim 6 wherein an upper surface of the wiper blade defines a blade plane, and wherein the at least two yokes are coplanar with the blade plane and the harness is substantially coplanar with the blade plane, the superstructure thus having a low profile with respect to the wiper blade.

* * * * *